(12) United States Patent
Kunz et al.

(10) Patent No.: US 11,171,889 B2
(45) Date of Patent: Nov. 9, 2021

(54) TECHNIQUE FOR PACKET BUFFERING

(71) Applicant: Telefonaktiebolaget LM Ericsson (publ), Stockholm (SE)

(72) Inventors: Georg Kunz, Aachen (DE); Nikolas Hermanns, Aachen (DE); Jan Scheurich, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 103 days.

(21) Appl. No.: 16/500,119

(22) PCT Filed: Apr. 7, 2017

(86) PCT No.: PCT/EP2017/058365
§ 371 (c)(1),
(2) Date: Oct. 2, 2019

(87) PCT Pub. No.: WO2018/184689
PCT Pub. Date: Oct. 11, 2018

(65) Prior Publication Data
US 2020/0351211 A1   Nov. 5, 2020

(51) Int. Cl.
*H04L 12/861* (2013.01)
*H04L 12/24* (2006.01)
(Continued)

(52) U.S. Cl.
CPC .......... *H04L 49/90* (2013.01); *H04L 41/0627* (2013.01); *H04L 41/0886* (2013.01);
(Continued)

(58) Field of Classification Search
CPC ............... H04L 47/283; H04L 41/0627; H04L 41/0886; H04L 45/566; H04L 47/32;
(Continued)

(56) References Cited

U.S. PATENT DOCUMENTS

| | | | | |
|---|---|---|---|---|
| 7,675,925 | B2 * | 3/2010 | Jones | .......... H04L 49/9021 370/412 |
| 8,271,716 | B2 * | 9/2012 | Srinivasan | .......... G06F 5/00 710/310 |

(Continued)

OTHER PUBLICATIONS

OpenFlow Switch Specification, Version 1.5.0, Dec. 19, 2014 (Year: 2014).*
(Continued)

*Primary Examiner* — Hashim S Bhatti
(74) *Attorney, Agent, or Firm* — Coats + Bennett, PLLC

(57) ABSTRACT

A technique for buffering packets in a Software Defined Networking (SDN) infrastructure is disclosed. A method implementation of the technique is performed by an SDN network device and comprises receiving (S304) a configuration message from an SDN controller, the configuration message defining at least one characteristic characterizing packets to be buffered, receiving (S306) a packet, triggering (S308) inserting the packet into a buffer if the packet matches the at least one characteristic, and triggering (S310) sending a notification message to the SDN controller notifying the SDN controller that the packet is inserted into the buffer.

20 Claims, 12 Drawing Sheets

(51) Int. Cl.
*H04L 12/721* (2013.01)
*H04L 12/841* (2013.01)
*H04L 12/823* (2013.01)
*H04L 29/12* (2006.01)

(52) U.S. Cl.
CPC .......... *H04L 45/566* (2013.01); *H04L 47/283* (2013.01); *H04L 47/32* (2013.01); *H04L 61/103* (2013.01); *H04L 61/6022* (2013.01)

(58) Field of Classification Search
CPC ... H04L 49/90; H04L 61/103; H04L 61/6022; H04L 45/64; H04L 45/00
See application file for complete search history.

(56) References Cited

U.S. PATENT DOCUMENTS

| | | | | |
|---|---|---|---|---|
| 8,295,282 | B2* | 10/2012 | Schlenk | H04L 12/4625 370/392 |
| 8,341,282 | B2* | 12/2012 | Bassali | H04N 21/6332 709/231 |
| 8,531,985 | B2* | 9/2013 | Rao | H04L 47/6215 370/252 |
| 8,874,780 | B2* | 10/2014 | Beverly | G06F 9/54 709/232 |
| 9,104,643 | B2* | 8/2015 | DeCusatis | H04L 41/0695 |
| 9,225,635 | B2* | 12/2015 | Kumbhare | H04L 45/38 |
| 9,461,729 | B2* | 10/2016 | Djukic | H04W 40/205 |
| 9,473,414 | B2* | 10/2016 | Anand | H04L 47/24 |
| 2015/0381492 | A1 | 12/2015 | Kamble et al. | |
| 2017/0272367 | A1* | 9/2017 | Kozat | H04L 47/24 |
| 2017/0353572 | A1* | 12/2017 | Wang | H04L 29/06 |
| 2020/0343969 | A1* | 10/2020 | Cui | H04B 7/18591 |

OTHER PUBLICATIONS

In-Band Synchronization for Distributed SDN Control Planes—Liron Schiff, Stefan Schmid and Petr Kuznetsov—ACM SIGCOMM Computer Communications Review—Jan. 2016 (Year: 2016).*
Optimizing performance of packet capture in virtual containers of OpenVZ—Yi Zhao, Guanyuan Zhang andJiangning Cui—Institute of Computing Technology, Chinese Academy of Sciences, (Year: 2010).*
Practical Usage of MVS REXX, Anthony S. Rudd, Springer-Verlag, 1996 (Year: 1996).*
Proposal and Evaluation of SDN-based mobile packet core networks—Van-Giang Nguyen and Younghan Kim—EURASIP Journal on Wireless Communications and Networking—2015—Article 172 (Year: 2015).*
McKeown, N. et al., "OpenFlow: Enabling Innovation in Campus Networks", ACM SIGCOMM Computer Communication Review, vol. 38 No. 2, Apr. 1, 2008, pp. 69-74, ACM.
Open Networking Foundation, "OpenFlow Switch Specification", V1.0.0 (Wire Protocol 0x01), Dec. 31, 2009, pp. 1-42, ONF.
Open Networking Foundation, "OpenFlow Switch Specification", V1.5.0 (Protocol Version 0x06), Dec. 19, 2014, pp. 1-277, ONF.

* cited by examiner

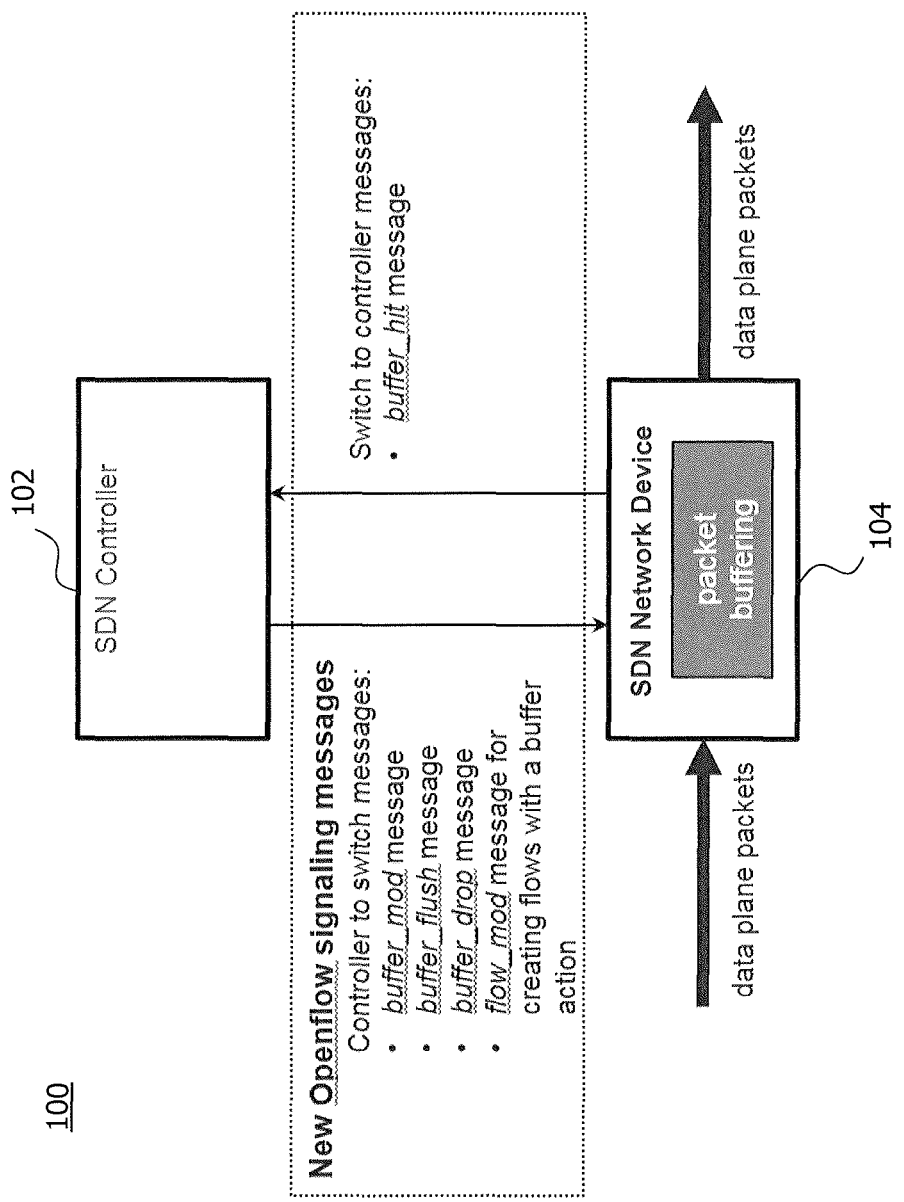

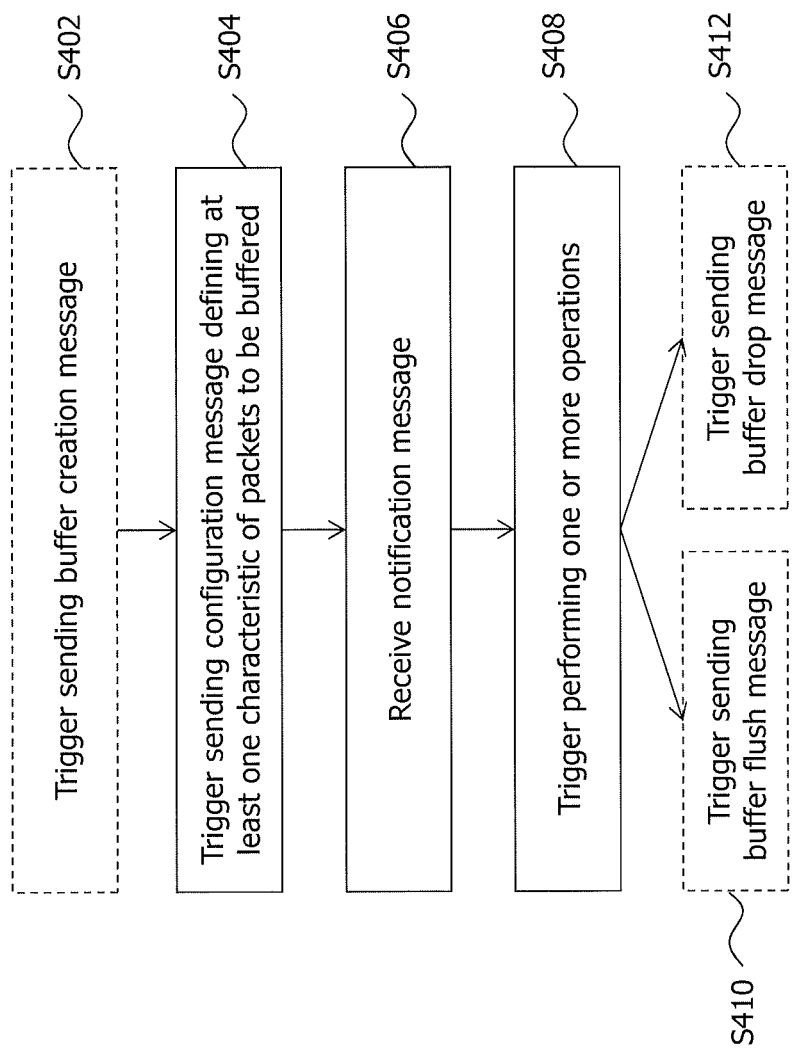

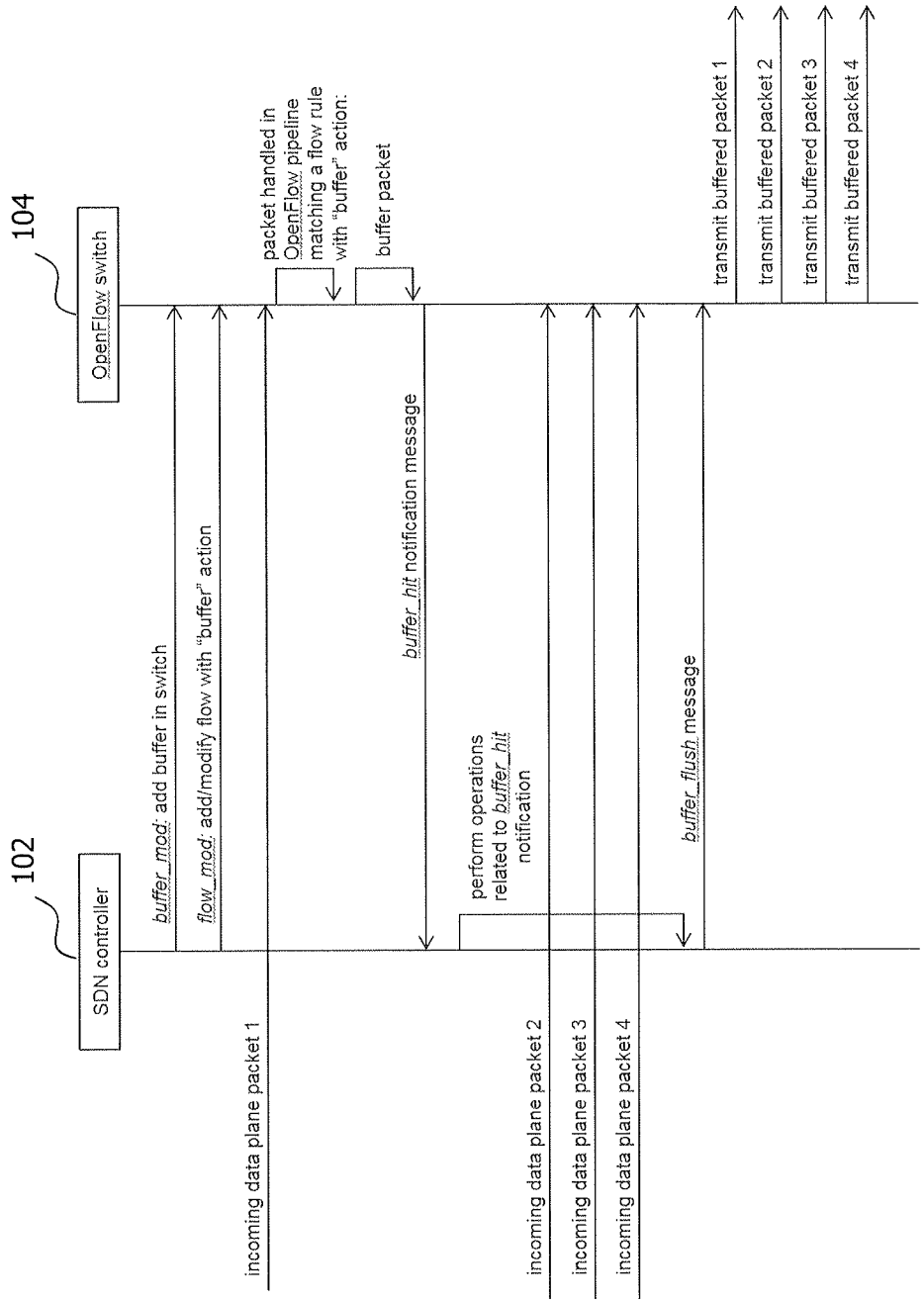

TECHNIQUE FOR PACKET BUFFERING

TECHNICAL FIELD

The present disclosure generally relates to the field of Software Defined Networking (SDN). In particular, a technique for buffering packets in an SDN infrastructure is presented. The technique may be embodied in methods, computer programs, apparatuses and systems.

BACKGROUND

In recent years, Software Defined Networking (SDN) has evolved as a network architectural concept that allows network administrators to dynamically control network behavior in computing environments. SDN architectures decouple network control and forwarding functions, enabling network control to become directly programmable and the underlying infrastructure to be abstracted for applications and network services. More precisely, SDN architectures decouple entities that make decisions on where network traffic is sent (e.g., "SDN controllers", also referred to as "control plane") from the underlying network components that forward traffic to selected destinations (e.g., "SDN datapaths", such as SDN switches, also referred to as "data plane").

One example of a protocol widely used for communication between SDN controllers and SDN switches is Open-Flow. OpenFlow may be used by SDN controllers to program the behavior of SDN switches by installing flow rules (also called "flow entries") in the switches. A flow rule may comprise a set of match fields which are applied to packets arriving at the switch. If a packet matches the match fields, a set of corresponding actions may be executed on the packet. Flow rules may be organized in flow tables and a sequence of flow tables may form an OpenFlow pipeline, wherein matching starts at the first flow table and may continue at subsequent tables of the pipeline. In addition to programming flow rules, OpenFlow allows for exchanging signaling messages between SDN controllers and SDN switches. Such messages can be used by SDN switches to notify an SDN controller about specific conditions and enables the SDN controller to signal particular actions to be performed by the SDN switches. The OpenFlow protocol is defined, for example, in the OpenFlow Switch Specification, version 1.5.0 (protocol version 0x06) of the Open Networking Foundation (ONF).

In packet-based communication systems, a wide range of applications require buffering of packets. An incoming packet of a data stream may need to be buffered, for example, until it is determined how the packet is to be further processed. In order to realize such behavior, OpenFlow provides a message called packet_in which enables an SDN switch to send a received packet (or a fraction thereof) to an SDN controller in order to have the SDN controller determine how the packet is to be processed. When using the packet_in message, the SDN switch can optionally store the packet in a buffer and communicate a corresponding buffer ID to the SDN controller as part of the packet_in message. The SDN controller can then release the packet from the buffer by sending a packet_out message including the buffer ID to the SDN switch. Upon receiving the packet_out message with a valid buffer ID, the SDN switch can remove the packet from the buffer and execute a set of actions defined by the SDN controller in the packet_out message. Among others, these actions can include forwarding the packet to a specific port of the SDN switch or injecting the packet into a flow table of the OpenFlow pipeline, for example.

According to the OpenFlow protocol, however, it is not mandatory for SDN switches to support such buffering. Rather, SDN controllers have to be able to deal with SDN switches that are entirely incapable of buffering packets. In such cases, incoming packets have to be transferred in their entirety as part of the packet_in/packet_out messages exchanged between the SDN controller and the SDN switch. This can result in considerable load due to signaling traffic between both entities. Further, even if an SDN switch is capable of buffering packets, the packet_in/packet_out mechanism requires that each individual packet is sent to the SDN controller to be handled by the controller accordingly. Considering that an SDN controller is by design a logically centralized entity managing a potentially large number of SDN switches, this can quickly overload the SDN controller and thereby significantly limit the scalability of the overall SDN infrastructure.

SUMMARY

Accordingly, there is a need for a packet buffering technique in an SDN infrastructure that avoids one or more of the problems discussed above, or other problems.

According to a first aspect, a method for buffering packets in an SDN infrastructure is provided. The method is performed by an SDN network device and comprises receiving a configuration message from an SDN controller, the configuration message defining at least one characteristic characterizing packets to be buffered, receiving a packet, triggering inserting the packet into a buffer if the packet matches the at least one characteristic, and triggering sending a notification message to the SDN controller notifying the SDN controller that the packet is inserted into the buffer.

The SDN network device may be one of a plurality of SDN network devices that are controlled by the SDN controller in the SDN infrastructure. The SDN network device may be an "SDN datapath" in the sense of known SDN architectures, e.g., a logical network device, such as an SDN switch or router, that may be executed on a single physical network or computing device or across multiple physical network or computing devices by means of virtualization techniques, for example. The SDN controller may communicate with the SDN network device to control the SDN network device and/or to configure its behavior to realize desired network functionality in the SDN infrastructure.

The SDN network device may receive the configuration message from the SDN controller if it is desired that packets having a specific characteristic are buffered before these packets are further processed by the SDN network device, e.g., before these packets are forwarded to a port of the SDN network device for further transmission over the network. The at least one characteristic defined in the configuration message may enable the SDN network device to uniquely determine whether a received packet is a packet to be buffered. The at least one characteristic may comprise at least one parameter which is to be matched by the received packet, such as a particular IP address contained in an IP header of the packet, for example. The SDN network device may check whether the received packet matches the at least one characteristic and, if a match is determined, the packet may be inserted into the buffer and the notification message may be sent to the SDN controller in order to notify the SDN controller that the packet is buffered. The notification message may optionally include the buffered packet itself (or a fraction thereof). If no match is determined, the received packet may not be inserted into the buffer, no notification message may be sent and the packet may be further processed without any buffering. For a plurality of subsequently received packets, this process may be repeated for each packet and, therefore, each packet matching the at least one characteristic may increase the number of packets stored in the buffer until the buffer is either flushed, dropped, or a buffer limit is reached, for example.

Triggering sending the notification message may not have to be performed each time a packet is inserted into the buffer. Rather, after triggering sending the notification message, further notification messages about packets inserted into the buffer may not be sent to the SDN controller until a next empty state of the buffer is reached. In one such implementation, between two subsequent empty states of the buffer, triggering sending the notification message may be performed once (i.e., exactly one time) when the number of packets inserted into the buffer reach a predetermined threshold for the first time. In other words, all subsequently received packets matching the at least one characteristic may be inserted into the buffer, but no additional notification messages may be sent to the SDN controller until the next empty state of the buffer. In a particular variant, the predetermined threshold may be set to 1 so that, between two empty states of the buffer, triggering sending the notification message may be performed once (i.e., exactly one time) when the received packet is the first packet inserted into the buffer (i.e., when the received packet is the first packet inserted into the buffer after an empty state of the buffer). The notification message generally indicates to the SDN controller that the buffer is holding at least one packet for processing.

Upon receiving the notification message, the SDN controller may perform one or more operations depending on the particular use case. Once these operations are completed and the SDN controller is ready to release the packets from the buffer, the SDN controller may send a buffer flush message to the SDN network device. The method of the first aspect may thus further comprise receiving a buffer flush message from the SDN controller, and triggering releasing all packets from the buffer in response to the buffer flush message. The buffer flush message may define one or more actions to be performed on the released packets and the method of the first aspect may thus further comprise triggering performing the one or more actions on the released packets. The one or more actions may comprise forwarding the released packets to a port of the SDN network device or performing a packet modification, for example.

In case it is determined by the SDN controller that the packets stored in the buffer are not to be further processed (e.g., because they are no longer needed and may be discarded), the SDN controller may send a buffer drop message to the SDN network device. The method of the first aspect may thus further comprise receiving a buffer drop message from the SDN controller, and triggering discarding all packets from the buffer in response to the buffer drop message.

Generally, the buffer may be created by the SDN network device at any suitable time prior to inserting the first packet into the buffer. In one particular implementation, the buffer may be created in response to an explicit buffer creation message sent by the SDN controller to the SDN network device. The method of the first aspect may thus further comprise, prior to receiving the configuration message, receiving a buffer creation message from the SDN controller, and triggering creating the buffer in response to the buffer creation message, wherein the configuration message may indicate that packets matching the at least one characteristic are to be inserted into the buffer (i.e., the buffer which has been created in response to the buffer creation message). It will be understood that additional messages for deleting or modifying the buffer may be sent by the SDN controller to the SDN network device, upon which the SDN network device may delete or modify the buffer accordingly.

The buffer may be one of a plurality of buffers maintained by the SDN network device, wherein each of the plurality of buffers is addressable in messages of the SDN controller by a buffer ID. Thus, what has been described above for the buffer (i.e., a single buffer), may apply to each of the plurality of buffers maintained by the SDN network device, wherein each buffer may be distinguished by its unique buffer ID. For example, the SDN network device may receive a plurality of configuration messages from the SDN controller, wherein each configuration message defines different matching characteristics for packets to be buffered. Separate buffers may thus be associated with different matching characteristics so that received packets that match the characteristics of packets associated with a particular buffer are inserted into the respective buffer.

The buffer ID may be assigned by the SDN network device, but may also be chosen by the SDN controller. In one variant, the buffer ID may be assigned by the SDN controller as part of a buffer creation message so that the created buffer may be addressed by the SDN controller in subsequent messages by the chosen buffer ID (e.g., in configuration messages, buffer flush messages and buffer drop messages). In such a case, the buffer ID may be included in the configuration message in order to indicate that packets matching the at least one characteristic defined by the configuration message are to be inserted into the particular buffer that corresponds to the buffer ID. The buffer flush message and the buffer drop message may include a buffer ID in order to identify the buffer which is to be flushed or dropped, respectively. The buffer ID may also be included in notification messages sent from the SDN network device to the SDN controller so that the SDN controller may know into which buffer the packet is inserted. While the above-described communication between the SDN network device and the SDN controller may be implemented using any suitable protocol, the SDN network device and the SDN controller may, in one particular implementation, communicate with each other by using an OpenFlow protocol. As an example, communication between the SDN network device and the SDN controller may be in compliance with the ONF OpenFlow Switch Specification, version 1.5.0 (protocol version 0x06), or a successor version thereof. The above-described messages (e.g., buffer creation message, configuration message, notification message, buffer flush message and buffer drop message) which do not form part of such specification may be included as extensions to such protocol. In a particular variant, the configuration message may be a flow creation message (e.g., a "flow_mod" message in accordance with the OpenFlow protocol), wherein the flow creation message may include a buffer action (i.e., an "action" in accordance with the OpenFlow protocol) to indicate that packets of the flow are to be buffered in the buffer.

According to a second aspect, a method for buffering packets in an SDN infrastructure is provided. The method is performed by an SDN controller and comprises triggering sending a configuration message to an SDN network device, the configuration message defining at least one characteristic characterizing packets to be buffered by the SDN network device, receiving a notification message from the SDN network device indicating that a packet that matches the at least one characteristic is inserted into a buffer of the SDN network device, and triggering performing one or more operations upon receiving the notification message.

The method according to the second aspect defines a method from an SDN controller's perspective which may be complementary to the method according to the first aspect performed by an SDN network device. As such, those aspects described with regard to the method of the first aspect which are applicable to the method of the second aspect may be comprised by the method of the second aspect as well, and vice versa. Unnecessary repetitions are thus omitted in the following.

Upon receiving the notification message from the SDN network device, informing the SDN controller that a packet is inserted into the buffer, the SDN controller may trigger performing one or more operations. These operations may vary depending on the particular use case and may comprise calculations of the SDN controller itself or interactions of the SDN controller with other entities. When the SDN controller and the SDN network device communicate using the OpenFlow protocol, these operations may include programming new flow rules or updating existing flow rules in the SDN network device, for example. The one or more operations may also be directed to determining when the packets may be released from the buffer.

Once these operations are completed and the SDN controller is ready to release the packets from the buffer, the SDN controller may instruct the SDN network device accordingly. The method of the second aspect may thus further comprise triggering sending a buffer flush message to the SDN network device to release all packets from the buffer of the SDN network device. The buffer flush message may define one or more actions to be performed by the SDN network device on the released packets. The one or more actions may comprise forwarding the released packets to a port of the SDN network device or performing a packet modification, for example. When the OpenFlow protocol is used for communication, the one or more actions may also comprise injecting the released packets into a flow table of the OpenFlow pipeline. In particular, the one or more actions may comprise recirculating the released packets by injecting them into the first table of the OpenFlow pipeline, for example.

In case the SDN controller determines that the packets stored in the buffer are not to be further processed (e.g., because they are no longer needed and may be discarded), the method of the second aspect may further comprise triggering sending a buffer drop message to the SDN network device to discard all packets from the buffer of the SDN network device.

In order to create the buffer in the SDN network device, the method of the second aspect may also comprise, prior to triggering sending the configuration message, triggering sending a buffer creation message to the SDN network device to create the buffer of the SDN network device. The configuration message may in this case indicate that packets matching the at least one characteristic are to be inserted into the buffer (i.e., the buffer which has been created in response to the buffer creation message).

As in the method of the first aspect, the buffer may be one of a plurality of buffers maintained by the SDN network device, wherein each of the plurality of buffers is addressable in messages of the SDN controller by a buffer ID. Also, the SDN network device and the SDN controller may communicate with each other by using an OpenFlow protocol, wherein, in a particular such variant, the configuration message may be a flow creation message, wherein the flow creation message may include a buffer action to indicate that packets of the flow are to be buffered in the buffer.

As mentioned above, the one or more operations performed by the SDN controller upon receiving the notification message from the SDN network device may vary depending on the particular use case. One such use case may be related to mobile broadband networks, such as LTE networks, for example, where a radio link between a User Equipment (UE) and a base station may regularly be set to an idle state during periods of inactivity in order to conserve energy in the UE. If downlink traffic destined to a particular UE currently being in an idle state arrives from the Internet at the mobile broadband network, e.g., at the Serving Gateway (Serving GW) of an Evolved Packet Core (EPC), it cannot be forwarded immediately to the UE. Instead, the corresponding data needs to be buffered and the UE first needs to be waked up by means of a paging procedure. Once the radio link between the UE and the base station is reestablished, all buffered data may be forwarded to the UE.

In order to realize such scenario using an SDN infrastructure, the above-described packet buffering technique may be employed. For example, when a UE enters an idle state, the EPC control plane may signal this state change to the SDN controller. This signaling may contain all information needed to uniquely identify packets destined to the UE, such as a tuple describing the packets' IP header or a unique Tunnel Endpoint Identifier (TEID) used for the UE. The SDN controller may then send a configuration message to the SDN network device (which may in this case be an SDN-based packet gateway, for example) defining the characteristics of packets to be buffered. When matching packets arrive at the SDN network device, e.g., from the Internet through the SGi interface, the packets may be buffered and a notification message may be sent to the SDN controller accordingly. The SDN controller may then notify the EPC control plane which, in turn, may trigger a paging mechanism to wake up the UE. Once the UE is active, the EPC control plane may signal this information to the SDN controller which, in turn, may trigger sending out the buffered packets to the UE using a buffer flush message defining an action according to which the packets are forwarded to a port of the SDN network device for further transmission to the UE.

In the sense of the method of the second aspect, it may be summarized that the at least one characteristic may include information identifying packets destined to a UE in a mobile communication system, the UE being in an idle state, wherein the one or more operations performed upon receiving the notification message may include performing signaling to trigger waking up the UE, and wherein triggering sending the buffer flush message may be performed upon receiving a notification that the UE is in an active state. The information identifying packets destined to the UE may comprise at least one of an IP header and a TEID required for packets destined to the UE.

Another use case may be related to Address Resolution Protocol (ARP) resolution performed by routing devices. Upon receiving a packet, routers typically perform a routing table lookup to identify the IP address of the next network hop to which the packet is to be forwarded. If the Media Access Control (MAC) address corresponding to the IP address of the next hop is unknown, it must be determined using ARP resolution. During ARP resolution, all packets destined for the particular next hop need to be buffered until the destination MAC address is available.

In order to realize such scenario using an SDN infrastructure, the above-described packet buffering technique may be employed as well. The SDN network device may in this case be an SDN-based router and the SDN controller may send, for a next hop (or possibly for every next hop) in the routing table of the SDN network device, a configuration message to the SDN network device defining the IP address of the respective next hop as part of the matching characteristics for packets to be buffered. Upon arrival of packets destined to the next hop, these packets may be buffered and a notification message may be sent to the SDN controller accordingly. The SDN controller may then perform ARP resolution for the IP address of the next hop. Once the ARP resolution is complete, the SDN controller may trigger forwarding the buffered packets by sending a buffer flush message the SDN network device, wherein the buffer flush message may define an action according to which the resolved MAC address is set in the flushed packets as destination MAC address for the next hop. The SDN controller may send another message to the SDN network device to delete the buffer as it is no longer needed for the time being. The SDN controller may also associate a timer with each resolved MAC address. Once a timer for a particular MAC address times out, a respective buffer may again be configured and ARP resolution may be repeated.

In the sense of the method of the second aspect, it may be summarized that the at least one characteristic may include an IP address included in a routing table of the SDN network device, the IP address identifying a next hop for which ARP resolution is to be performed, wherein the one or more operations performed upon receiving the notification message may include performing ARP resolution for the next hop, and wherein triggering sending the buffer flush message may be performed when a MAC address corresponding to the IP address is resolved using the ARP resolution. The SDN controller may also maintain a timer associated with the MAC address to refresh the MAC address periodically by repeating the ARP resolution.

According to a third aspect, a computer program product is provided. The computer program product comprises program code portions for performing the method of at least one of the first and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a computing unit configured to execute an SDN network device for buffering packets in an SDN infrastructure is provided. The computing unit comprises at least one processor and at least one memory, the at least one memory containing instructions executable by the at least one processor such that the SDN network device is operable to receive a configuration message from an SDN controller, the configuration message defining at least one characteristic characterizing packets to be buffered, receive a packet, trigger inserting the packet into a buffer if the packet matches the at least one characteristic, and trigger sending a notification message to the SDN controller notifying the SDN controller that the packet is inserted into the buffer.

According to a fifth aspect, a computing unit configured to execute an SDN controller for buffering packets in an SDN infrastructure is provided. The computing unit comprises at least one processor and at least one memory, the at least one memory containing instructions executable by the at least one processor such that the SDN controller is operable to trigger sending a configuration message to an SDN network device, the configuration message defining at least one characteristic characterizing packets to be buffered by the SDN network device, receive a notification message from the SDN network device indicating that a packet that matches the at least one characteristic is inserted into a buffer of the SDN network device, and trigger performing one or more operations upon receiving the notification message.

The computing units according to the fourth aspect and the fifth aspect may be configured to perform any of the corresponding methods and method steps presented herein.

According to a sixth aspect, there is provided a system comprising a computing unit of the fourth aspect and a computing unit of the fifth aspect.

BRIEF DESCRIPTION OF THE DRAWINGS

Embodiments of the technique presented herein are described herein below with reference to the accompanying drawings, in which:

FIG. 1 schematically illustrates an SDN infrastructure including an SDN controller and an SDN network device outlining an overview of messages exchanged between these entities in an exemplary OpenFlow based implementation;

FIGS. 4a and 4b illustrate a modular composition of a computing unit configured to execute an SDN controller and a corresponding method embodiment which may be performed by the SDN controller;

FIG. 5 illustrates an exemplary sequence of messages exchanged between the SDN controller and the SDN network device of FIG. 1;

DETAILED DESCRIPTION

Figure 2A:
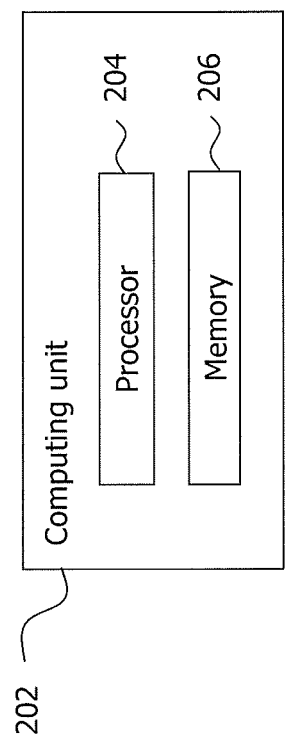
FIGS. 2a and 2b illustrate exemplary compositions of computing units configured to execute an SDN controller and an SDN network device.

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, while the following embodiments will be described with regard to the OpenFlow protocol, it will be understood that the present disclosure shall not be limited to the OpenFlow protocol and that the technique presented herein may be practiced with other protocols suitable for implementing SDN infrastructures.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

FIG. 1 schematically illustrates an SDN infrastructure 100 which includes an SDN controller 102 and an SDN network device 104. As in common SDN architectures, the SDN controller 102 may communicate with the SDN network device 104 to control the SDN network device 104 and/or to configure its behavior to realize desired network functionality in the SDN infrastructure 100. The SDN network device 104 may be an "SDN datapath" in the sense of known SDN architectures, e.g., a logical network device, such as an SDN switch or router, for example, which may receive data plane packets, optionally modify these packets, and forward them to selected destinations in the network. The SDN network device 104 may be given by an OpenFlow switch which may, for example, be configured in accordance with the ONF OpenFlow Switch Specification, version 1.5.0 (protocol version 0x06), or successor versions thereof. It will be understood that an OpenFlow based implementation of the SDN network device 104 is merely exemplary and that other implementations are generally conceivable. In the following, the functions of the SDN controller 102 and the SDN network device 104 will thus be described generically (i.e., independently of an OpenFlow based implementation) and, only where appropriate, specifically in relation to the OpenFlow protocol in order to provide concrete implementation examples of the technique presented herein.

In order to realize an SDN-based packet buffering technique, the SDN controller 102 and the SDN network device 104 may exchange a number of signaling messages which are exemplarily shown in the middle of FIG. 1. These messages are not available in present OpenFlow specifications (herein, present OpenFlow specifications are collectively referred to as "the OpenFlow protocol"), such as ONF OpenFlow Switch Specification, version 1.5.0 (protocol version 0x06), and, therefore, these messages may be seen as an extension to the OpenFlow protocol. As shown in FIG. 1, the new messages may include messages sent from the SDN controller 102 to the SDN network device 104, including a buffer creation message ("buffer_mod"), a buffer flush message ("buffer_flush"), a buffer drop message ("buffer_drop") and a configuration message ("flow_mod" with a "buffer" action), and messages sent from the SDN controller 102 to the SDN network device 104, including a notification message ("buffer_hit"). These messages will be described in detail below.

FIG. 2a illustrates an exemplary composition of a computing unit 202 which is configured to execute the SDN controller 102. The computing unit 202 comprises at least one processor 204 and at least one memory 206, wherein the at least one memory 206 contains instructions executable by the at least one processor 204 such that the computing unit 202 is operable to carry out the method steps described herein with reference to the SDN controller 102.

Figure 2B:
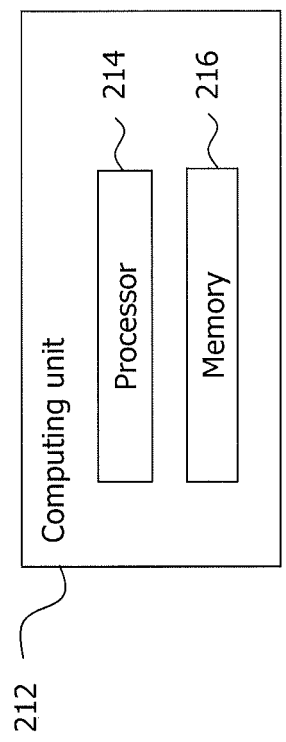

FIG. 2b illustrates an exemplary composition of a computing unit 212 which is configured to execute the SDN network device 104. The computing unit 212 comprises at least one processor 214 and at least one memory 216, wherein the at least one memory 216 contains instructions executable by the at least one processor 214 such that the computing unit 212 is operable to carry out the method steps described herein with reference to the SDN network device 104.

It will be understood that the computing units 202 and 212 may be physical computing units as well as virtualized computing units, such as virtual machines, for example. It will further be appreciated that the computing units may not necessarily be implemented as standalone computing units, but may be implemented as components—realized in software and/or hardware—residing on multiple distributed computing units as well.

Figure 3A:
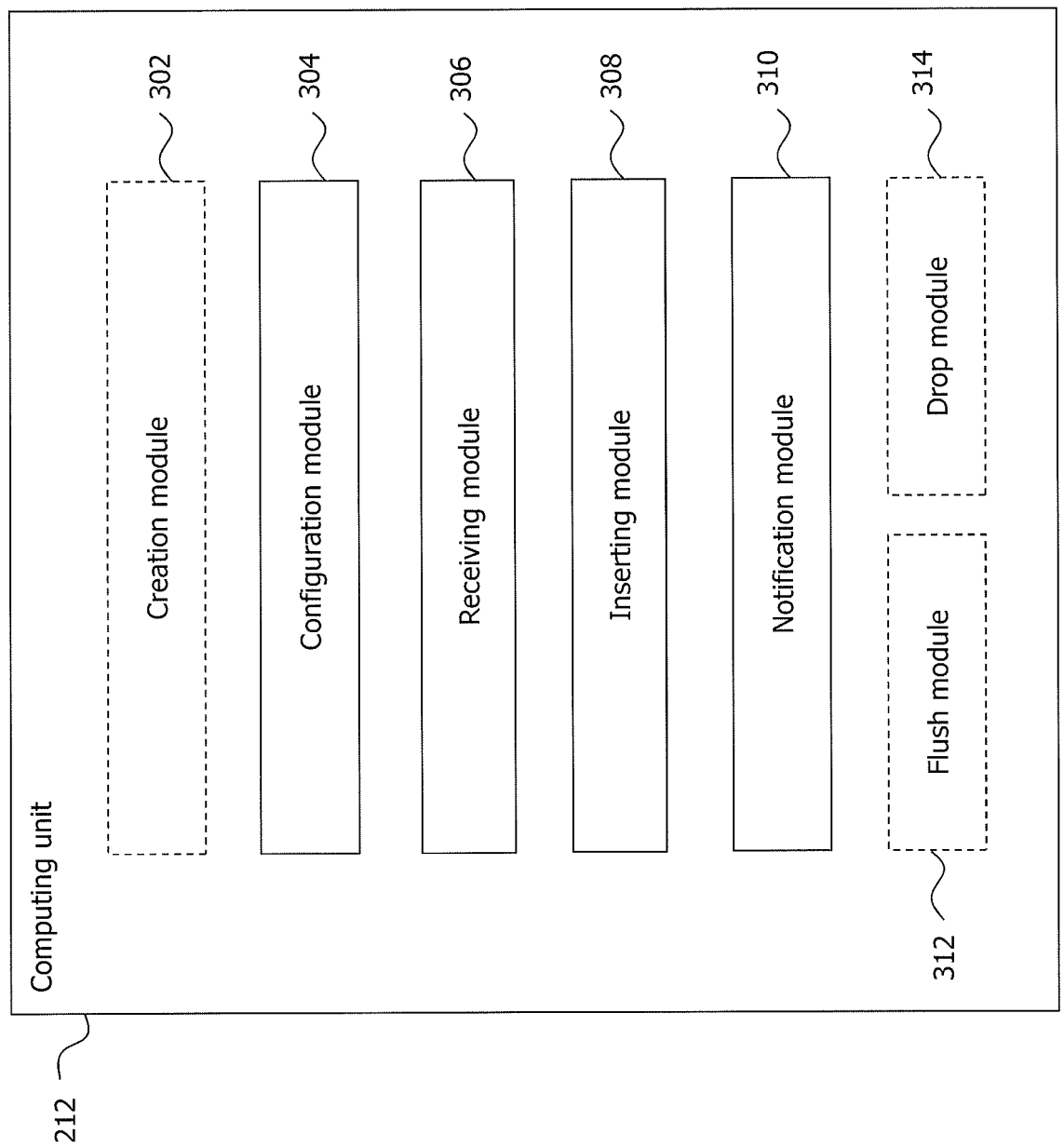
FIGS. 3a and 3b illustrate a modular composition of a computing unit configured to execute an SDN network device and a corresponding method embodiment which may be performed by the SDN network device.
Figure 3B:
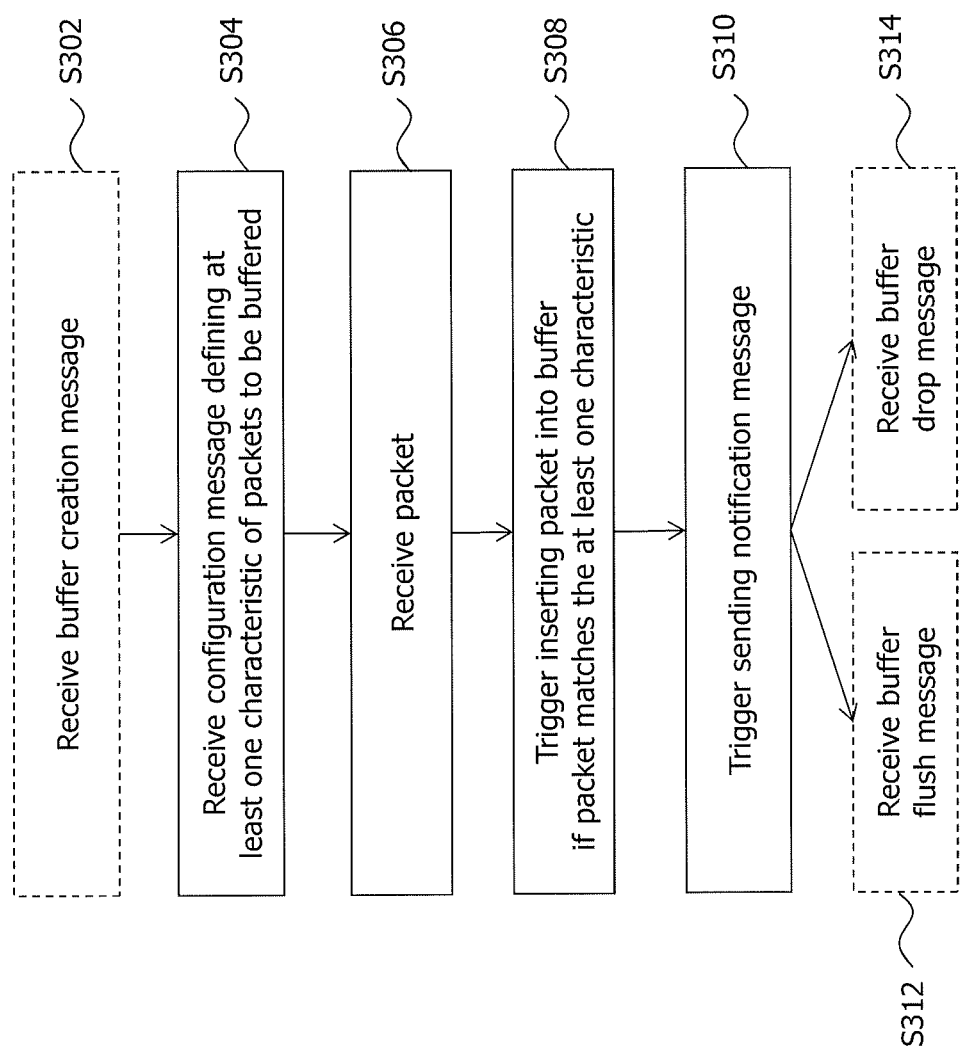

FIG. 3a schematically illustrates an exemplary modular composition of the computing unit 212 which is configured to execute the SDN network device 104 and FIG. 3b illustrates a corresponding method embodiment which may be performed by the SDN network device 104. The basic operation of the SDN network device 104 will be described in the following with reference to both FIGS. 3a and 3b.

In an optional step S302, a creation module 302 of the computing unit 212 may receive a buffer creation message from the SDN controller 102 and trigger creating a buffer. Further, in step S304, a configuration module 304 of the computing unit 212 may receive a configuration message from the SDN controller 102. The configuration message may define at least one characteristic characterizing packets to be buffered. The at least one characteristic may enable the SDN network device 104 to uniquely determine whether a received packet is a packet to be buffered and may comprise at least one parameter which is to be matched by the received packet, such as a particular IP address contained in an IP header of the packet, for example. The configuration message may further indicate that packets matching the at least one characteristic are to be inserted into the buffer (i.e., the particular buffer that has been created in response to the buffer creation message). It will be understood that, if a buffer creation message is not sent by the SDN controller 102, the SDN network device 104 may create the buffer itself at any suitable time prior to inserting the first packet into the buffer.

As an extension to the OpenFlow protocol, the configuration message may be implemented by the flow creation message "flow_mod", for example. According to the OpenFlow protocol, the "flow_mod" message may be used by SDN controllers to program the behavior of SDN switches by installing flow rules in the switches. A flow rule may comprise a set of match fields which are applied to packets arriving at the switch. Thus, the at least one characteristic may be included in the form of one or more match fields in the "flow_mod" message, for example. Further, according to the OpenFlow protocol, the "flow_mod" message may include one or more "actions" to be performed by SDN switches on a matching packet Thus, instructing the SDN network device 104 that packets are to be buffered may be implemented by introducing a new type of action, namely a "buffer" action, which may be included in the "flow_mod" message sent to the SDN network device 104.

The buffer created in response to the buffer creation message may be one of a plurality of buffers maintained by the SDN network device 104, wherein each of the plurality of buffers may be addressable in messages of the SDN controller 102 by a buffer ID. For example, the SDN network device 104 may have received a plurality of configuration messages from the SDN controller 102, wherein each configuration message may define different matching characteristics for packets to be buffered. Separate buffers may thus be associated with different matching characteristics so that received packets that match the characteristics of packets associated with a particular buffer are inserted into the respective buffer.

The buffer ID may in one variant be assigned by the SDN network device 104, but may in another variant be chosen by the SDN controller 102. In particular, the buffer ID may be assigned by the SDN controller as part of the buffer creation message so that the created buffer may be addressed by the SDN controller 102 in subsequent messages by the corresponding buffer ID (e.g., in configuration messages, buffer flush messages and buffer drop messages). For example, the buffer ID may be included in the configuration message in order to indicate that packets matching the at least one characteristic defined by the configuration message are to be inserted into the particular buffer that corresponds to the buffer ID. The buffer flush message and the buffer drop message may include the buffer ID to identify the buffer which is to be flushed or dropped, respectively. The buffer ID may also be included in the notification messages sent from the SDN network device 104 to the SDN controller 102 so that the SDN controller 102 may know into which buffer the packet is inserted.

In step S306, a receiving module 306 of the computing unit 212 may receive a packet, e.g., a packet to be forwarded by the SDN network device 104 to another destination in the network. An inserting module 308 of the computing unit 212 may check whether the received packet matches the at least one characteristic associated with the buffer. In case of a match, the inserting module 308 may trigger, in step S308, inserting the packet into the buffer accordingly. In step S310, a notification module 310 of the computing unit 212 may then trigger sending a notification message to the SDN controller 102 notifying the SDN controller 102 that the packet is inserted into the buffer. If no match is determined, on the other hand, the packet may not be inserted into the buffer, no notification message may be sent and the packet may be further processed by the SDN network device 104 without any buffering. For a plurality of subsequently received packets, steps S306 to S310 may be repeated for each packet and, therefore, each packet matching the at least one characteristic may increase the number of packets stored in the buffer until the buffer is either flushed, dropped, or a buffer limit is reached, for example.

Triggering sending the notification message according to step S310 may not have to be performed each time a packet is inserted into the buffer. Rather, after triggering sending the notification message, further notification messages about packets inserted into the buffer may not be sent to the SDN controller 102 until a next empty state of the buffer is reached. In this way, signaling traffic between the SDN controller 102 and the SDN network device 104 may be reduced. In one such implementation, between two subsequent empty states of the buffer, triggering sending the notification message may be performed once (i.e., exactly one time) when the number of packets inserted into the buffer reaches a predetermined threshold for the first time. In other words, all subsequently received packets matching the at least one characteristic may be inserted into the buffer, but no additional notification messages may be sent to the SDN controller 102 until the next empty state of the buffer. In a particular variant, the predetermined threshold may be set to 1 so that, between two empty states of the buffer, triggering sending the notification message may be performed once (i.e., exactly one time) when the received packet is the first packet inserted into the buffer (i.e., when the received packet is the first packet inserted into the buffer after an empty state of the buffer). In this variant, signaling traffic between the SDN controller 102 and the SDN network traffic 104 may be significantly reduced because only the insertion of the first packet into the buffer is signaled to the controller, but no subsequent insertions. As such, the notification message may be used to indicate to the SDN controller 102 that the buffer is holding at least one packet for processing.

Upon receiving the notification message, the SDN controller 102 may perform one or more operations depending on the particular use case. Once these operations are completed and the SDN controller 102 is ready to release the packets from the buffer, the SDN controller 102 may send a buffer flush message to the SDN network device 104. Thus, in an optional step S312, a flush module 312 of the computing unit 212 may receive a buffer flush message from the SDN controller 102 and trigger releasing all packets from the buffer in response to the buffer flush message. The buffer flush message may define one or more actions to be performed on the released packets so that the flush module 312 may further trigger performing the one or more actions on the released packets. The one or more actions may comprise forwarding the released packets to a port of the SDN network device 104 or performing a packet modification, for example. When the OpenFlow protocol is used for communication between the SDN controller 102 and the SDN network device 104, the one or more actions may also comprise injecting the released packets into a flow table of the OpenFlow pipeline. In particular, the one or more actions may comprise recirculating the released packets by injecting them into the first table of the OpenFlow pipeline, for example.

In case it is determined by the SDN controller 102 that the packets stored in the buffer are not to be further processed (e.g., because they are no longer needed and may be discarded), the SDN controller 102 may send a buffer drop message to the SDN network device 104. Thus, in an optional step S314, a drop module 314 of the computing unit 212 may receive a buffer drop message from the SDN controller 102 and trigger discarding all packets from the buffer in response to the buffer drop message.

Figure 4A:
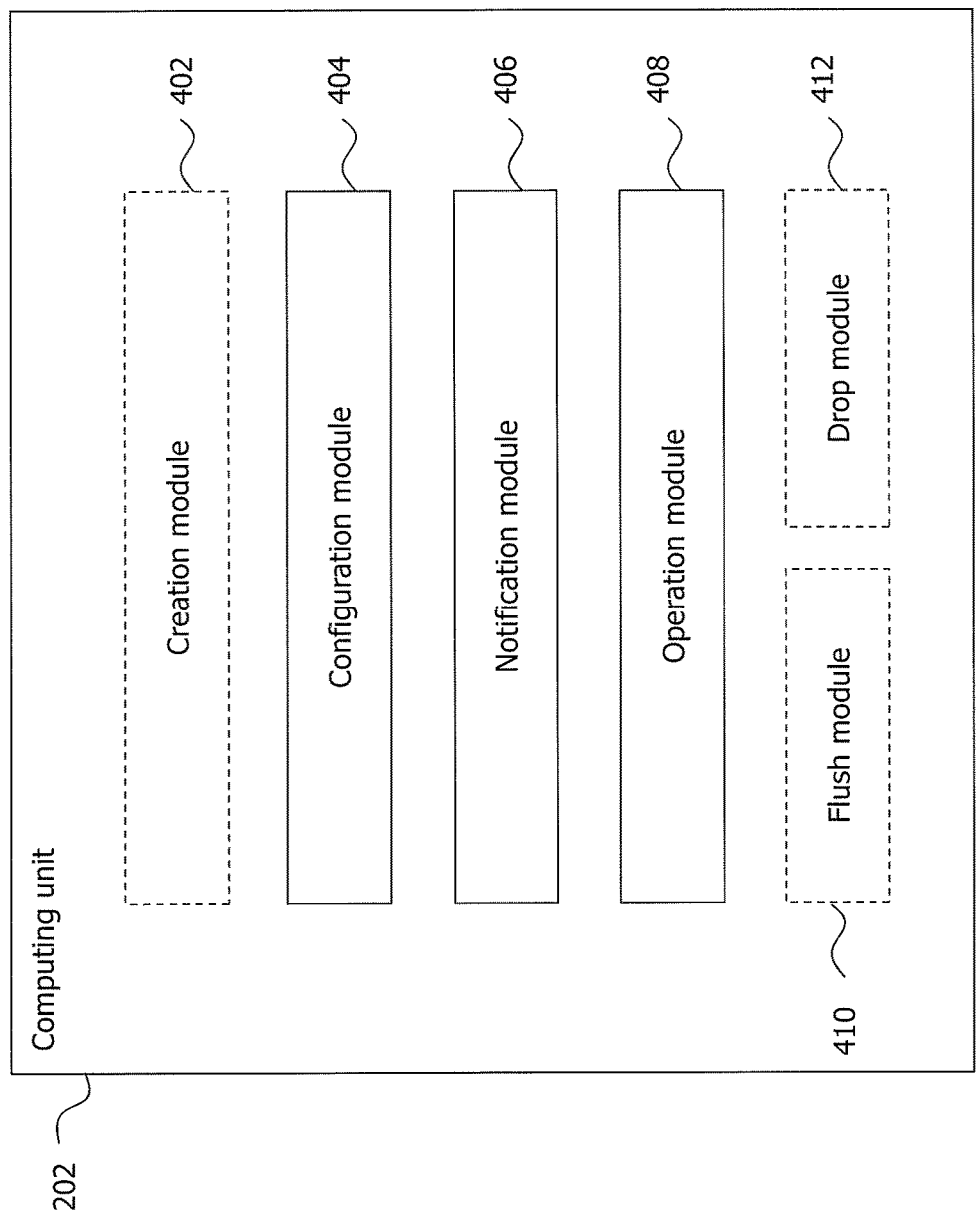

FIG. 4a schematically illustrates an exemplary modular composition of the computing unit 202 which is configured to execute the SDN controller 102 and FIG. 4b illustrates a corresponding method embodiment which may be performed by the SDN controller 102. The basic operation of the SDN controller 102 will be described in the following with reference to both FIGS. 4a and 4b. This operation may be complementary to the operation of the SDN network device 104 described above in relation to FIGS. 3a and 3b.

In an optional step S402, a creation module 402 of the computing unit 202 may trigger sending a buffer creation message to the SDN network device 104 to create the buffer of the SDN network device 104. Further, in step S404, a configuration module 404 of the computing unit 202 may trigger sending a configuration message to the SDN network device 104. As explained above, the configuration message may define at least one characteristic characterizing packets to be buffered by the SDN network device 104. The configuration message may indicate that packets matching the at least one characteristic are to be inserted into the buffer (i.e., the buffer which has been created in response to the buffer creation message).

In step S406, a notification module 406 of the computing unit 202 may receive a notification message from the SDN network device 104 indicating that a packet that matches the at least one characteristic is inserted into the buffer of the SDN network device 104. Further, in step S408, an operation module 408 of the computing unit 202 may trigger performing one or more operations upon receiving the notification message. These operations may vary depending on the particular use case and may comprise calculations of the SDN controller 102 itself and/or interactions of the SDN controller 102 with other entities. When the OpenFlow protocol is used for communication, these operations may include installing new flow rules in or updating existing flow rules in the SDN network device 104, for example. The one or more operations may also be directed to determining when the packets may be released from the buffer.

Once these operations are completed and the SDN controller 102 is ready to release the packets from the buffer, the SDN controller 102 may instruct the SDN network device 104 accordingly. Thus, in step S410, a flush module 410 of the computing unit 202 may trigger sending a buffer flush message to the SDN network device 104 to release all packets from the buffer of the SDN network device. As explained above, the buffer flush message may define one or more actions to be performed by the SDN network device on the released packets.

In case the SDN controller 102 determines that the packets stored in the buffer are not to be further processed (e.g., because they are no longer needed and may be discarded), a drop module 412 of the computing unit 202 may, in step S412, trigger sending a buffer drop message to the SDN network device 104 to discard all packets from the buffer of the SDN network device 104.

An exemplary implementation of the generically described messages above will now be described using structs of the C programming language as an extension to the OpenFlow protocol. In accordance with the OpenFlow protocol, the SDN network device 104 will in the following be referred to as an OpenFlow switch.

A buffer modify message "buffer_mod" may be used to add, update and/or delete buffers in an OpenFlow switch. The buffer_mod message may represent an implementation of the buffer creation message mentioned above and may further be used for the purpose of deleting and modifying a buffer. The syntax may be as follows:

struct ofp_buffer_mod{struct ofp_header header; uint16_t command; /*One of OFPMC_*. */uint32_t buffer_id; /*Buffer instance. */};

Here, the buffer_id field may uniquely identify the buffer to be modified. The command field may be defined as follows:

enum ofp_buffer_mod_command{OFPMC_ADD, /* New buffer. */OFPMC_MODIFY, /* Modify specified buffer. */OFPMC_DELETE, /* Delete specified buffer. */};

As already explained above, the configuration message mentioned above may be realized by the flow creation message "flow_mod" of the OpenFlow protocol, wherein a new type of action, namely a "buffer" action, may be included in the flow_mod message in order to indicate that packets that match the match fields included in the flow_mod message are to be buffered in a particular buffer. The buffer action may comprise the following fields:

struct ofp_action_buffer{uint32_t buffer_id; /*unique identifier of this buffer*/uint16_t max_length; /*number of stored packets before dropping */uint8_t drop_policy; /*first or last packet hitting the buffer */uint16_t timeout; /*how long shall packets be buffered*/uint16_t max_len; /*bytes of first packet to include in buffer_hit */uint16_t buffer_hit_threshold; /*how many packet need to be buffered before sending a buffer_hit notification message*/}

Here, the buffer_id may again uniquely identify the buffer. The max_length field may indicate a size of the buffer, e.g., the number of packets that may be buffered before the OpenFlow switch starts to drop packets. A value of −1 may indicate that the maximum number of packets supported by the OpenFlow switch shall be buffered. The drop_policy field may be used to control how the OpenFlow switch shall handle overflow situations, i.e., situations in which more packets are to be buffered than specified by the max_length field. This field may take the following values:

```
enum ofp_buffer_drop_policies {
    OFPR_BUFFER_DROP_FIRST; /* drop the packet which arrived first
                              */
    OFPR_BUFFER_DROP_LAST;  /* drop the packet which arrived last
                              */
}
```

The timeout field may indicate how long an individual packet must at least be buffered before it may be dropped. The OpenFlow switch may buffer packets longer, however. This may allow avoiding to start one timer per buffered packet. If the last buffered packet is dropped from the buffer so that the buffer is empty and a new packet arrives, a new buffer_hit notification message may be sent to the SDN controller. Likewise, if the last buffered packet is dropped from a buffer so that the buffer is empty and a buffer_timeout_notification field is set, the OpenFlow switch may send a notification to the SDN controller indicating that the buffer is empty now. The max_len field may indicate how many bytes of a packet inserted into the buffer should be sent to the SDN controller as part of a buffer_hit notification message. 0 may indicate that no packet data is to be included and −1 may indicate the entire packet is to be included. The buffer_hit_threshold field may indicate the number of packets that need to be buffered before the switch may send a buffer_hit notification message to the SDN controller. By default, this field may have a value of 1 meaning that, upon inserting the first packet into an empty buffer, the buffer_hit notification message is sent.

The notification message mentioned above which is sent when a packet is inserted into the buffer (i.e., "hits the buffer") may be implemented as a "buffer_hit" message as follows:

```
struct ofp_buffer_hit {
    uint32_t            buffer_id;
    uint8_t             context;
    uint8_t             table_id;
    uint64_t            cookie;
    struct ofp_match    match;
    uint8_t             data[0];
}
```

Here, the buffer_id may again uniquely identify the buffer. The context field may indicate from which context of the OpenFlow protocol the buffer_hit message was triggered. The context field may take any of the following values:

```
enum ofp_buffer_hit_context {
    OFPR_FLOW        = 0,    /* buffer action in flow. */
    OFPR_ACTION_SET  = 1,    /* buffer action in action set. */
    OFPR_GROUP       = 2,    /* buffer action in group bucket. */
};
```

The table_id field may indicate the ID of the flow table in which the buffer action resides. The context field may in this case equal to OFPR_FLOW. The cookie field may contain a cookie of the flow entry that is associated with the buffer which caused the buffer_hit message to be sent. This field may be set to −1 if a cookie cannot be associated with a particular flow. This may be the case, when the buffer_hit message was generated in association with a buffer residing in a group bucket or from an action set. The match field may correspond to a set of OXM TLVs (OpenFlow Extensible Match Type-Length-Values) comprising pipeline fields (e.g., packet headers and metadata) associated with a packet. The data field may contain part of the packet inserted into the buffer, wherein the packet may either be included in full or in truncated form.

The buffer flush message mentioned above may be realized as a "buffer_flush" message which may have the following fields:

```
struct ofp_buffer_flush {
    uint32_t                  buffer_id;
    uint32_t                  send_rate;
    uint16_t                  actions_len;
    struct ofp_action_header  actions[0];
}
```

Here, the buffer_id may again uniquely identify the buffer. The send_rate may specify how many packets per time unit shall be sent by the OpenFlow switch when flushing the buffer. The time unit may correspond to seconds, for example. A value of −1 may indicate that throttling is not desired. The actions_len field may specify the size of the array of the actions field in bytes. The actions field itself may be a list of actions specifying how the packet should be processed by the OpenFlow switch.

These actions may include packet modification, group processing and/or output port forwarding, for example.

The buffer drop message mentioned above may be implemented as a "buffer_drop" message which may have the following syntax:

```
struct ofp_buffer_drop {
    uint32_t buffer_id;
}
```

Here, the buffer_id may uniquely identify the buffer to be dropped.

It will be understood that the above specific implementation of the previously described generic messages as an extension to the OpenFlow protocol is merely exemplary and that other implementations are conceivable. It will also be appreciated that the fields and values of the C structs defined above represent mere examples and are not to be considered limiting. In particular, each of the above structs may take a different form and comprise only a portion of the fields indicated above, or other fields, for example. It will further be appreciated that the fields and values of the C structs defined above may be provided in generic form as parameters of the previously described generic messages.

In the following FIGS. 5 to 7, exemplary sequences of messages exchanged between the SDN controller 102 and the OpenFlow switch 104 will be described in accordance with the OpenFlow protocol extension. It will be appreciated that these message sequences can also be understood as use case examples for the previously described generic messages.

In FIG. 5, a basic message sequence is illustrated. In this example, initially, an empty buffer is created by sending a buffer_mod message with an "add" command from the SDN controller 102 to the OpenFlow switch 104. Then, a new flow is created by sending a flow_mod message including a "buffer" action to the OpenFlow switch 104, referencing the previously created buffer by its buffer ID. If an incoming packet matches the flow rule with the associated "buffer" action, the packet is buffered accordingly. This packet is the first packet inserted into the empty buffer and, therefore, a buffer_hit notification message is sent to the SDN controller 102. Upon receiving the notification message, the SDN controller 102 may perform any required operations before returning a buffer_flush message to the OpenFlow switch 104, instructing the OpenFlow switch 104 to release all buffered packets from the buffer.

Figure 6:
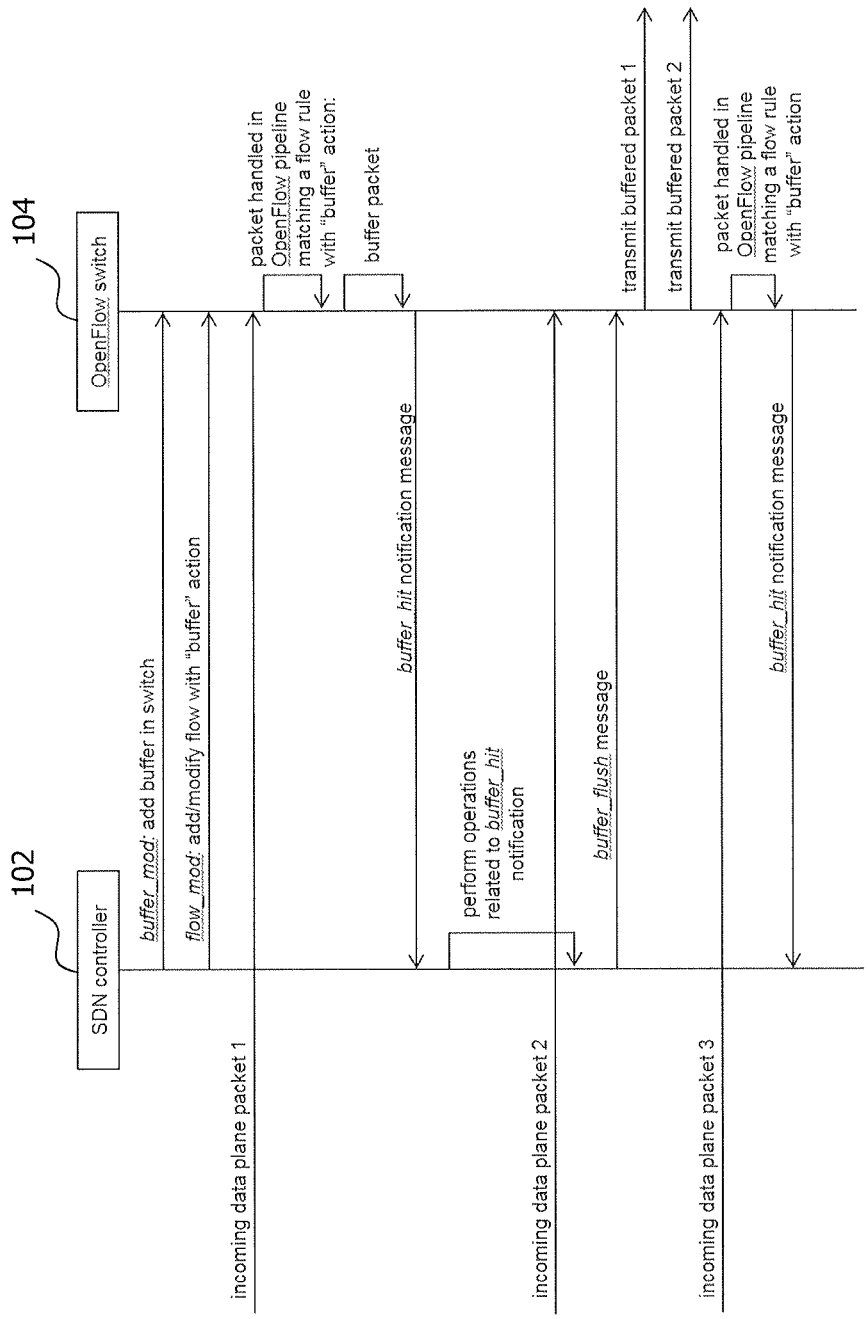
FIG. 6 illustrates an exemplary sequence of messages exchanged between the SDN controller and the SDN network device of FIG. 1 in a case in which the notification message is sent after flushing the buffer.

FIG. 6 shows an exemplary sequence of messages in a case in which the notification message is sent after flushing the buffer. This example elucidates that the buffer_hit notification message may be sent every time a first packet is inserted into an empty buffer. As may be seen here, when the SDN controller 102 sends a buffer_flush message to the OpenFlow switch 104, all buffered packets are released from the buffer. As a result, the buffer is empty again and, therefore, upon buffering the next incoming packet, the OpenFlow switch 104 sends a new buffer_hit notification message to the SDN controller 102.

Figure 7:
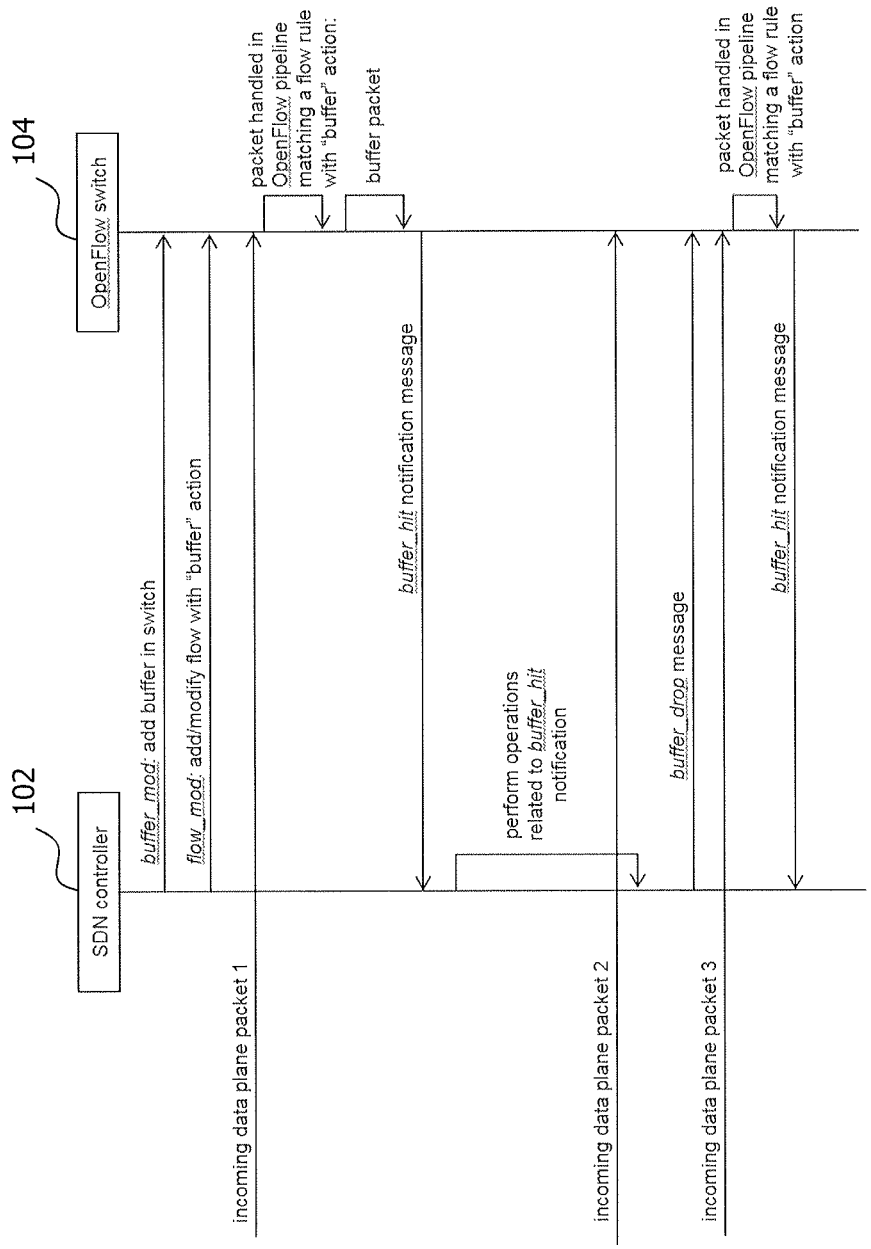
FIG. 7 illustrates an exemplary sequence of messages exchanged between the SDN controller and the SDN network device of FIG. 1 in a case in which the notification message sent after dropping the buffer.

FIG. 7 shows a similar sequence of messages for a case in which the notification message is sent after dropping the buffer. As may be seen here, when the SDN controller 102 sends a buffer_drop message to the OpenFlow switch 104, all buffered packets are removed from the buffer and discarded. The buffer is thus empty again and, hence, upon buffering the next incoming packet, the OpenFlow switch 104 sends a new buffer_hit notification message to the SDN controller 102.

Figure 8:
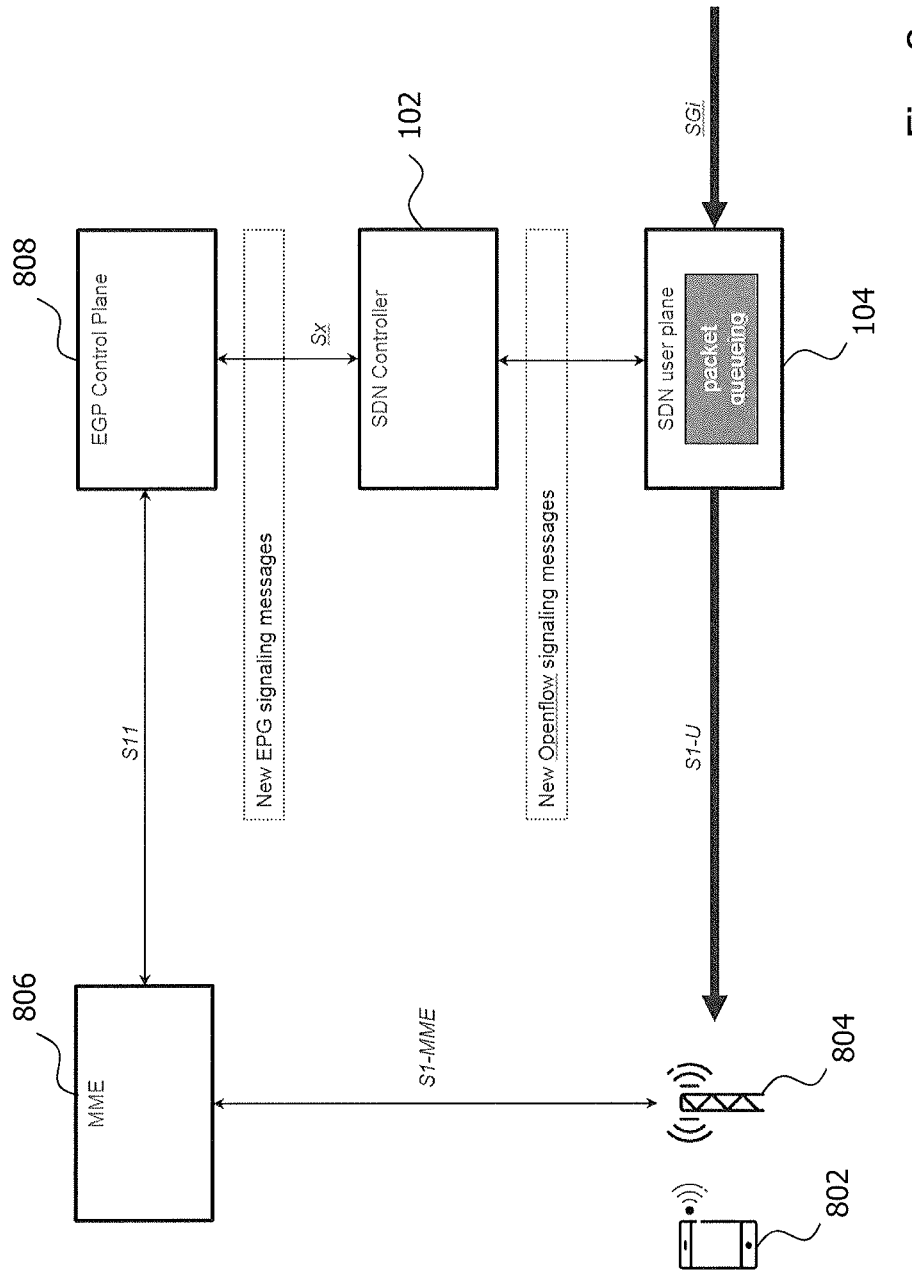
FIG. 8 schematically illustrates a mobile communication system in which packet buffering is employed according to an exemplary use case of the present disclosure.
Figure 9:
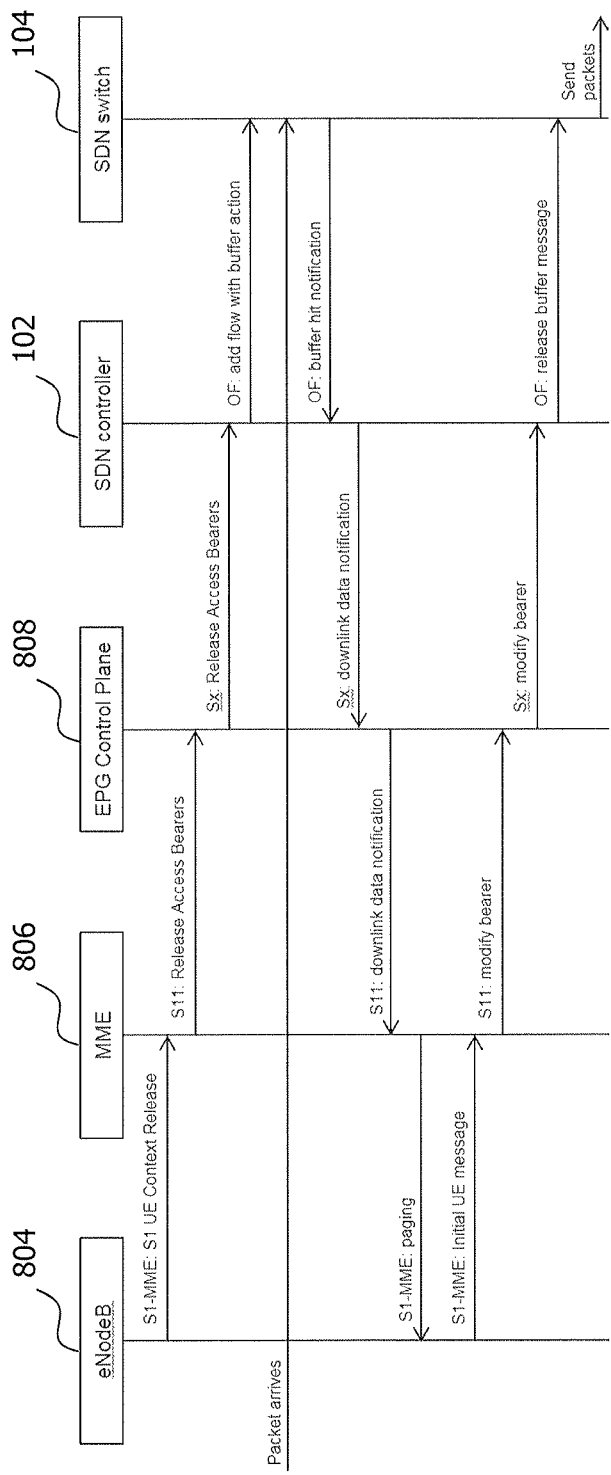
FIG. 9 illustrates a sequence of messages exchanged between the entities shown in FIG. 8.

In the following, reference is made to FIGS. 8 and 9 which illustrate a use case scenario of the packet buffering technique presented herein in a mobile broadband network. In mobile broadband networks, such as LTE networks, a radio link between a UE and a base station may regularly be set to an idle state during periods of inactivity in order to conserve energy in the UE. If downlink traffic destined to a particular UE currently being in an idle state arrives from the Internet at the mobile broadband network, it cannot be forwarded immediately to the UE. Instead, the corresponding data needs to be buffered and the UE first needs to be waked up by means of a paging procedure. Once the radio link between the UE and the base station is reestablished, all buffered data may be forwarded to the UE.

In order to realize such scenario using an SDN infrastructure, the following message sequence may take place. When the UE 802 enters an idle state, the corresponding eNodeB 804 may notify a Mobility Management Entity (MME) 806 about the UE context release via the S1-MME interface. The MME 806 may then send a release access bearers notification to an Evolved Packet Gateway (EPG) control plane 808 via the S11 interface and the EPG control plane 808, in turn, may send a similar message to the SDN controller 102 via the Sx interface. This message may contain all the information needed to uniquely identify packets destined to the UE 802, such as a tuple (e.g., a 5-tuple) describing that packets' IP header or a unique TEID used for the UE 802. The SDN controller 102 may then configure a buffer in the SDN switch 104 by creating a new flow with a "buffer" action and, once a matching packet arrives from the Internet via the SGi interface and is buffered in the SDN switch 104, the SDN switch 104 may return a buffer_hit notification message to the SDN controller 102. The SDN controller 102 may then send a downlink data notification via the Sx interface to the EPG control plane 808 which, in turn, may send a similar notification to the MME 806. Upon receiving this notification, the MME 806 may start, via the S1-MME interface, a paging procedure through the eNodeB 804 in order to wake up the UE 802. Once the UE 802 is active, the eNodeB 804 may notify the MME 806 about an initial UE message via the S1-MME interface and the MME 806 may send a modify bearer notification to the EPG control plane 808 which, in turn, may send a similar message to the SDN controller 102, thereby notifying the SDN controller 102 that the UE 802 is active again. The SDN controller 102 may thus send a buffer_flush message to the SDN switch 104 instructing the SDN switch 104 to release all packets from the buffer and forward them via the S1-U interface to the eNodeB 804 for further transmission to the UE 802.

Figure 10:
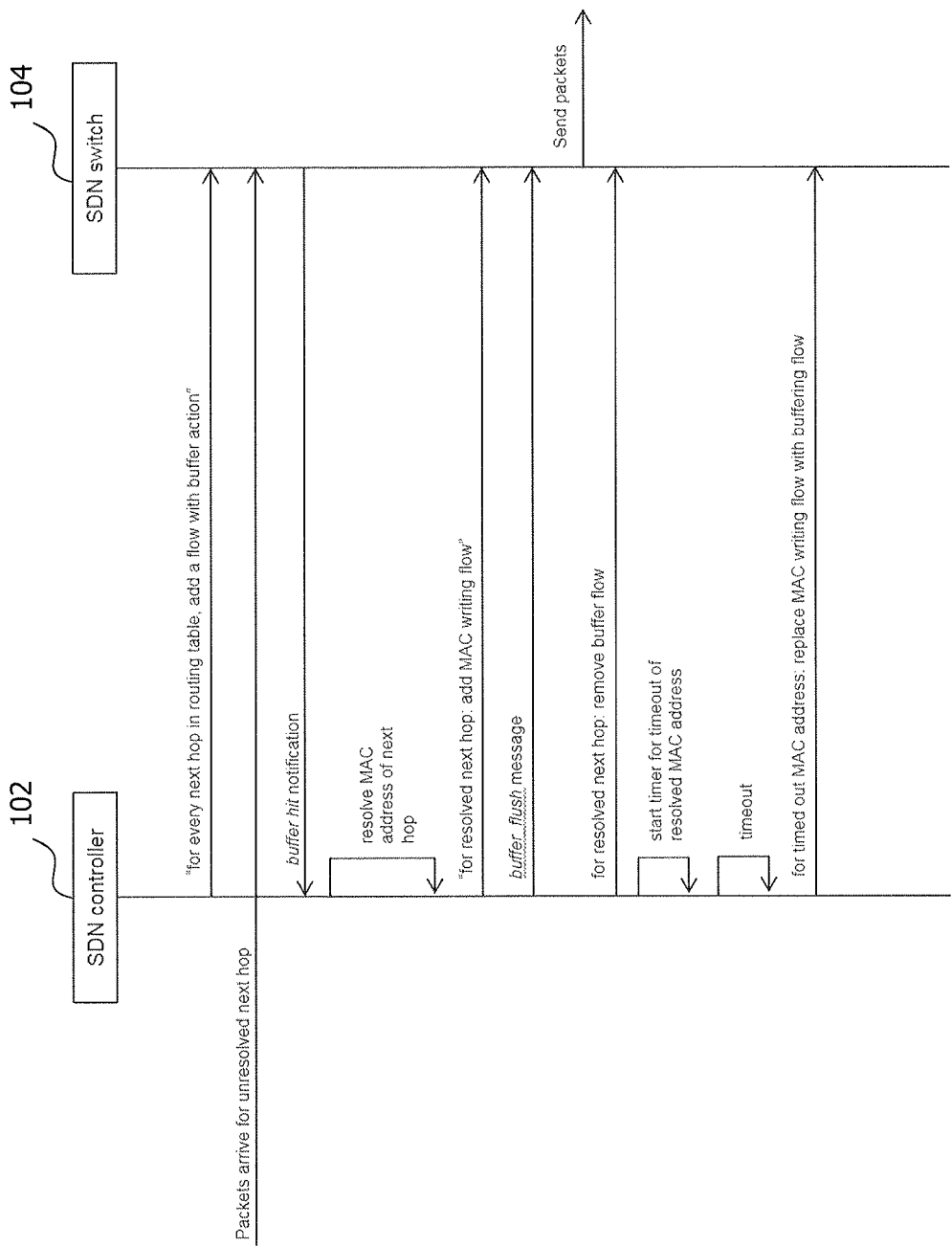
FIG. 10 illustrates a sequence of messages exchanged between an SDN controller and an SDN switch according to an exemplary use case of the present disclosure involving ARP resolution.

FIG. 10 illustrates another use case scenario which involves ARP resolution. Upon receiving a packet, routing devices typically perform a routing table lookup to identify the IP address of the next network hop to which the packet is to be forwarded. If the MAC address corresponding to the IP address of the next hop is unknown, the router must be determined using ARP resolution. During ARP resolution, all packets destined for the particular next hop need to be buffered until the destination MAC address is available.

In order to realize such scenario using an SDN infrastructure, the following message sequence may take place. The SDN switch 104 may in this case comprise an SDN-based router and the SDN controller 102 may configure, for every next hop in the routing table of the SDN switch 104, a buffer by adding a flow with a "buffer" action in the SDN switch 104, wherein the IP address of the respective next hop is included in the match fields of the flow. Upon arrival of packets destined to an unresolved next hop, these packets may be buffered and a buffer_hit notification message may be sent to the SDN controller 102 accordingly. The SDN controller 102 may then perform ARP resolution for the IP address to resolve the MAC address of the next hop. Once the ARP resolution is complete, the SDN controller 102 may add a new flow which sets the destination MAC address of the next hop in the packets accordingly. Further, the SDN controller 102 may trigger forwarding the buffered packets by sending a buffer flush message to the SDN switch 104. The packets may then be forwarded to the next hop. Also, the SDN controller 102 may send a message instructing the SDN switch 104 to delete the buffer for the resolved next hop as it is no longer needed for the time being (this can be done by sending a buffer_mod message with a "delete" command concerning the corresponding buffer flow). Further, the SDN controller 102 may start a timer for the resolved MAC address and, once the timer for this MAC address times out, a respective buffer may again be configured and ARP resolution may be repeated (this may be done by removing the flow which sets the destination MAC address and replacing it by a flow with a "buffer" action again). In this way, it may be ensured that ARP resolution is periodically refreshed for each next hop.

As has become apparent from the above, the present disclosure provides a technique for packet buffering in an SDN infrastructure that allows selectively and efficiently buffering groups of packets in an SDN network device. The presented technique may provide a clean mechanism which abstracts from having to handle individual packets in the SDN controller, as it is the case with the packet_in/packet_out mechanism of the OpenFlow protocol, for example. Instead, the present technique allows creating classes (flows) of buffered packets and handling them together in one control loop operation from an SDN network device to the SDN controller and back. The presented technique may thus significantly reduce the signaling traffic between the SDN controller and the attached SDN network devices because only the arrival of certain packets, such as the first packet inserted into the buffer, may be signaled to the SDN controller. The reduced signaling load may significantly improve the scalability of the overall SDN infrastructure, both regarding the SDN controller and the SDN network device. For use case scenarios, such as the mobile broadband network scenario described above, the presented technique may be considered to effectively make SDN-based implementations possible because OpenFlow switches could not efficiently implement such scenarios without an effective buffering mechanism. Finally, the presented technique may be used as an extension to the OpenFlow protocol comprising new signaling messages as well as a new action called "buffer". The explicit packet buffering action added to the OpenFlow protocol may allow implementing use cases which involve packet buffering more cleanly from an implementation perspective.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for buffering packets in a Software Defined Networking (SDN) infrastructure, the method comprising an SDN network device:
   receiving a configuration message from an SDN controller, the configuration message defining at least one characteristic characterizing packets to be buffered;
   receiving a packet;
   triggering inserting the packet into a buffer if the packet matches the at least one characteristic; and
   selectively triggering sending a notification message to the SDN controller notifying the SDN controller that the packet is inserted into the buffer based on a state of the buffer.

2. The method of claim 1, wherein, after triggering sending the notification message, further notification messages about packets inserted into the buffer are not sent to the SDN controller until a next empty state of the buffer is reached.

3. The method of claim 1, wherein, between two subsequent empty states of the buffer, triggering sending the notification message is performed once when the packet is the first packet inserted into the buffer.

4. The method of claim 1, further comprising:
   receiving a buffer flush message from the SDN controller; and triggering releasing all packets from the buffer in response to the buffer flush message.

5. The method of claim 4:
wherein the buffer flush message defines one or more actions to be performed on the released packets; and
further comprising triggering performing the one or more actions on the released packets.

6. The method of claim 5, wherein the one or more actions comprise forwarding the released packets to a port of the SDN network device.

7. The method of claim 1, further comprising:
receiving a buffer drop message from the SDN controller; and
triggering discarding all packets from the buffer in response to the buffer drop message.

8. The method of claim 1, further comprising:
prior to receiving the configuration message, receiving a buffer creation message from the SDN controller, wherein the configuration message indicates that packets matching the at least one characteristic are to be inserted into the buffer; and
triggering creating the buffer in response to the buffer creation message.

9. A method for buffering packets in a Software Defined Networking (SDN) infrastructure, the method comprising an SDN controller:
triggering sending a configuration message to an SDN network device, the configuration message defining at least one characteristic characterizing packets to be buffered by the SDN network device;
receiving, based on a state of a buffer of the SDN network device into which a packet that matches the at least one characteristic is inserted, a notification message from the SDN network device indicating that the packet was inserted into the buffer of the SDN network device; and
triggering performing one or more operations upon receiving the notification message.

10. The method of claim 9, further comprising triggering sending a buffer flush message to the SDN network device to release all packets from the buffer of the SDN network device.

11. The method of claim 10, wherein the buffer flush message defines one or more actions to be performed by the SDN network device on the released packets.

12. The method of claim 11, wherein the one or more actions comprise forwarding the released packets to a port of the SDN network device.

13. The method of claim 9, further comprising triggering sending a buffer drop message to the SDN network device to discard all packets from the buffer of the SDN network device.

14. The method of claim 9, further comprising, prior to triggering sending the configuration message, triggering sending a buffer creation message to the SDN network device to create the buffer of the SDN network device; wherein the configuration message indicates that packets matching the at least one characteristic are to be inserted into the buffer.

15. The method of claim 10:
wherein the at least one characteristic includes information identifying packets destined to a User Equipment (UE) in a mobile communication system, the UE being in an idle state;
wherein the one or more operations triggered to be performed upon receiving the notification message include performing signaling to trigger waking up the UE; and wherein triggering sending the buffer flush message is performed upon receiving a notification that the UE is in an active state.

16. The method of claim 15, wherein the information identifying packets destined to the UE comprises: an Internet Protocol (IP) header and/or a Tunnel Endpoint Identifier (TEID) required for packets destined to the UE.

17. The method of claim 10:
wherein the at least one characteristic includes an IP address included in a routing table of the SDN network device, the IP address identifying a next hop for which Address Resolution Protocol (ARP) resolution is to be performed;
wherein the one or more operations triggered to be performed upon receiving the notification message include performing ARP resolution for the next hop; and
wherein triggering sending the buffer flush message is performed when a Media Access Control (MAC) address corresponding to the IP address is resolved using the ARP resolution.

18. The method of claim 17, wherein the SDN controller maintains a timer associated with the MAC address to refresh the MAC address periodically by repeating the ARP resolution.

19. A computing unit configured to execute a Software Defined Networking (SDN) network device for buffering packets in an SDN infrastructure, the computing unit comprising:
processing circuitry;
memory containing instructions executable by the processing circuitry whereby the SDN network device is operative to:
receive a configuration message from an SDN controller, the configuration message defining at least one characteristic characterizing packets to be buffered;
receive a packet;
trigger inserting the packet into a buffer if the packet matches the at least one characteristic; and
selectively trigger sending a notification message to the SDN controller notifying the SDN controller that the packet is inserted into the buffer based on a state of the buffer.

20. A computing unit configured to execute a Software Defined Networking (SDN) controller for buffering packets in an SDN infrastructure, the computing unit comprising:
processing circuitry;
memory containing instructions executable by the processing circuitry whereby the SDN controller is operative to:
trigger sending a configuration message to an SDN network device, the configuration message defining at least one characteristic characterizing packets to be buffered by the SDN network device;
receive, based on a state of a buffer of the SDN network device into which a packet that matches the at least one characteristic is inserted, a notification message from the SDN network device indicating that the packet was inserted into the buffer of the SDN network device; and
trigger performing one or more operations upon receiving the notification message.

* * * * *